(12) United States Patent
Berriman et al.

(10) Patent No.: US 6,852,292 B2
(45) Date of Patent: Feb. 8, 2005

(54) AMMONIA STORAGE AND INJECTION IN NOX CONTROL

(75) Inventors: Lester P. Berriman, Irvine, CA (US);
John M. Zabsky, Santa Ana, CA (US);
Lionel S. Simons, Dana Point, CA (US)

(73) Assignee: KleenAir Systems, Inc., Irvine, CA (US)

(*) Notice: Subject to any disclaimer, the term of this patent is extended or adjusted under 35 U.S.C. 154(b) by 26 days.

(21) Appl. No.: 10/132,552

(22) Filed: Apr. 24, 2002

(65) Prior Publication Data

US 2003/0200743 A1 Oct. 30, 2003

(51) Int. Cl.$^7$ .............................. B01D 53/56; F01N 3/00
(52) U.S. Cl. ........................ 422/172; 422/169; 422/177
(58) Field of Search ................. 422/168–172, 422/177

(56) References Cited

U.S. PATENT DOCUMENTS

| | | | |
|---|---|---|---|
| 3,785,359 A | 1/1974 | Whittaker | 126/19.5 |
| 3,834,359 A * | 9/1974 | Ando | 60/276 |
| 3,959,440 A | 5/1976 | Mizuno et al. | 423/242 |
| 4,274,390 A | 6/1981 | Azuma | 126/19.5 |
| 4,314,345 A | 2/1982 | Shiraishi et al. | 422/111 |
| 4,328,020 A | 5/1982 | Hughes | 423/235 |
| 4,409,931 A | 10/1983 | Lindberg | 123/25 R |
| 5,050,796 A | 9/1991 | Raethel et al. | 432/222 |
| 5,224,346 A * | 7/1993 | Berriman et al. | 60/274 |
| 5,992,141 A | 11/1999 | Berriman et al. | 60/274 |
| 6,048,510 A | 4/2000 | Zauderer | 423/235 |
| 6,093,380 A | 7/2000 | Lagana et al. | 423/235 |
| 6,146,605 A | 11/2000 | Spokoyny | 423/235 |

* cited by examiner

Primary Examiner—Hien Tran
(74) Attorney, Agent, or Firm—Leon D. Rosen

(57) ABSTRACT

A system is described for storing ammonia and injecting it into the exhaust gas stream of an engine to reduce nitrogen oxides. The ammonia is stored as a liquid mixture (70) of ammonia and water in a container (50). In one system, the mixture passes through a tube with a portion (62) in contact with the exhaust gas pipe (16) to heat the mixture and separate the ammonia from the water, with the ammonia being further heated at a nozzle (84) to activate the ammonia before injection into an upstream portion of the exhaust gas pipe.

5 Claims, 3 Drawing Sheets

AMMONIA STORAGE AND INJECTION IN NOX CONTROL

BACKGROUND OF THE INVENTION

In our earlier U.S. Pat. Nos. 5,224,346 and 5,992,141, we described experiments which showed that the amount of nitrogen oxides (NO and $NO_2$), or NOx in engine exhaust gasses can be reduced by injecting ammonia ($NH_3$) which reacts with nitrogen oxides to produce nitrogen and water. One practical problem is how to store ammonia that is to be injected into the exhaust gas stream. Ammonia can be stored as a liquid, at a pressure of about 150 psi, with the ammonia turning into gas when removed from the container and its pressure reduced. It is often undesirable to store ammonia under considerable pressure because of the danger of an explosion and the possibility of rapid leakage of ammonia. Another way for storing ammonia is to store it as urea ($H_2NCO\ NH_2$) as in a solution with water, and inject it into the exhaust gas stream. However, it can take a longer time for urea to react with nitrogen oxides and turn them into nitrogen and water, than ammonia. Since the temperature of the exhaust gas stream very rapidly drops as the exhaust gasses move through the exhaust pipe into the atmosphere, it is desirable that the reactions occur very rapidly so they can occur at the high temperatures that exist in and near the exhaust gas manifold so that a high proportion of the injected material (ammonia or urea) can react with the nitrogen oxides. A system that enabled the storage of ammonia ($NH_3$) without requiring storage under high pressure, so that the ammonia could be directly injected into hot exhaust gasses and rapidly react with nitrogen oxides, would be of value.

SUMMARY OF THE INVENTION

In accordance with one embodiment of the present invention, a system is provided for storing and injecting ammonia into the exhaust gasses of an engine, which enables safe storage of the ammonia and the injection of ammonia into the exhaust gasses for rapid reaction with nitrogen oxides. The ammonia is stored as a liquid mixture of ammonia and water. The ammonia is preferably stored as a mixture of between 30 and 70 grams of ammonia per 100 grams of water. The liquid mixture is drawn off through a tube leading from the container. In one system, the tube is heated by the exhaust gasses, to separate the ammonia from the water. In another system, the mixture of ammonia and water is injected directly into the exhaust gasses.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
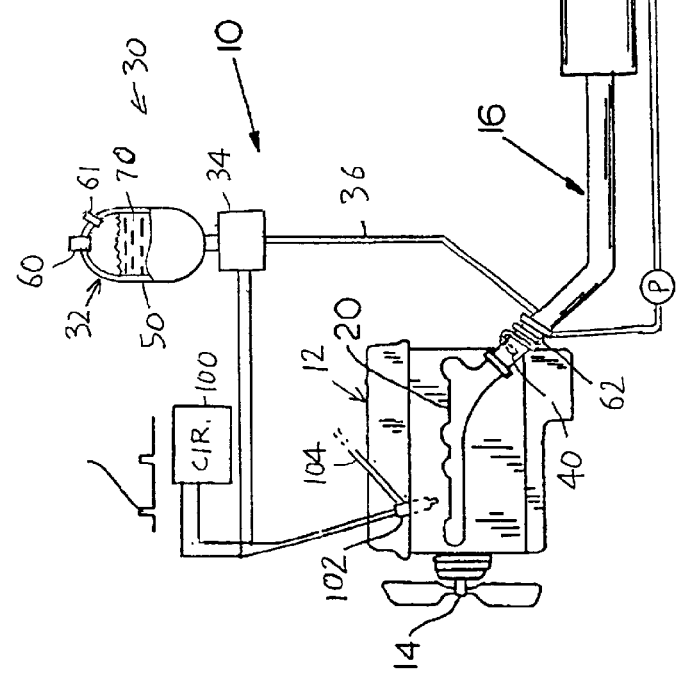
FIG. 1 is a simplified schematic view of an engine, with pollution reduction apparatus of the present invention installed therein.

FIG. 1 illustrates a system 10 of the present invention, wherein an engine 12 has cylinders in which fuel and air are combusted to turn a crankshaft 14. The combustion produces hot exhaust gasses that are passed through an exhaust conduit 16 into the atmosphere. The exhaust conduit includes a manifold 20 that is connected to a few cylinders to collect the exhaust gasses therefrom. A catalytic convertor 22 that lies along the exhaust conduit, is widely used in vehicle engines to reduce pollution.

FIG. 1 shows an ammonia injection system 30 that includes a source 32 of ammonia. A metering valve 34 passes ammonia from the source through a tube 36 to an ammonia injection location 40 where ammonia is injected into the exhaust conduit 16 to mix with hot exhaust gasses. The location 40 lies in or close to the exhaust gas manifold 20, so the ammonia encounters very hot exhaust gasses (usually over 1100° F. at high engine loads) to promote the reaction of ammonia and the exhaust gasses and thereby reduce nitrogen oxides.

Figure 2:
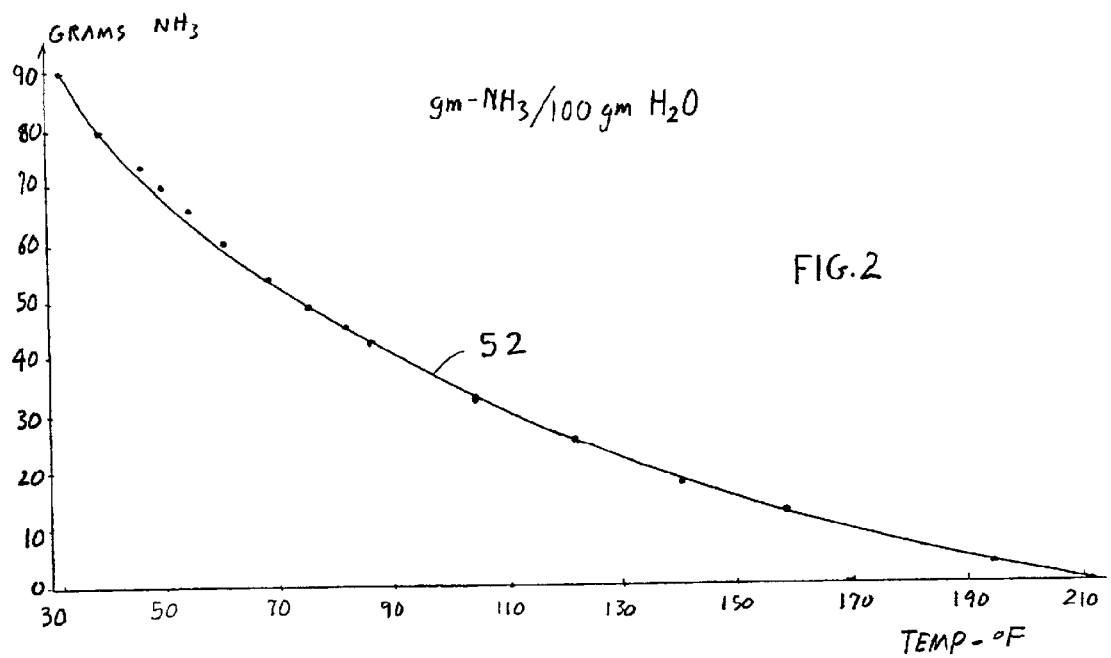
FIG. 2 is a graph showing variation of the saturation mass of ammonia in water as a function of temperature.
Figure 3:
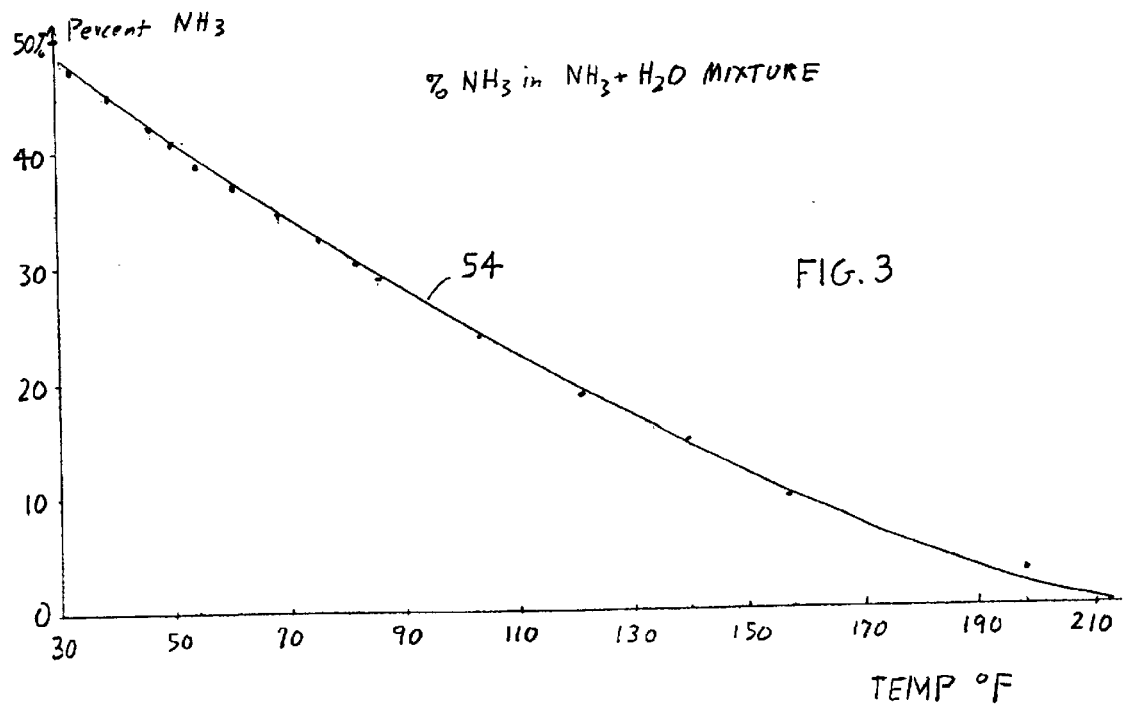
FIG. 3 is a graph similar to that of FIG. 2, but showing variation of the saturation percent (by mass) of ammonia in a mixture of ammonia and water, as a function of temperature.

In accordance with the present invention, the source 32 for ammonia is a container 50 that contains a mixture 70 of ammonia in water. FIG. 2 includes a graph 52 showing the mass of ammonia, at saturation in a solution that contains 100 grams of water, at different temperatures. FIG. 3 contains a similar graph 54 that shows the saturation percent, by mass, of ammonia in a solution of ammonia and water. It can be seen that the percent ammonia (by mass), ranges from about 47% at 32° F. through 33% ammonia at 72° F., down to 0% at 212° F. As a practical matter, applicant can vary the percent ammonia according to the weather, but prefers to establish about 25% ammonia, so the ammonia will not go out of the mixture unless the temperature of the mixture increases beyond about 105° F. Also, the container is kept away from the engine and is cooled by air, to avoid heating the container. If the container should be heated so that gaseous ammonia begins to accumulate under pressure and the pressure exceeds a certain limit (e.g. 2 psi), a relief valve 60 (FIG. 1) will slowly vent the gaseous ammonia into the atmosphere. The rate of ammonia vented is very small, so it is not dangerous. A check valve 61 (FIG. 1) can admit air to avoid a vacuum above the liquid when the liquid is withdrawn.

The tube 36 that carries the ammonia-water mixture has a portion 62 that is wrapped about the exhaust conduit 16, to rapidly heat the ammonia-water mixture that passes through the tube 36, with the ammonia portion carried to the injection location 40.

Figure 4:
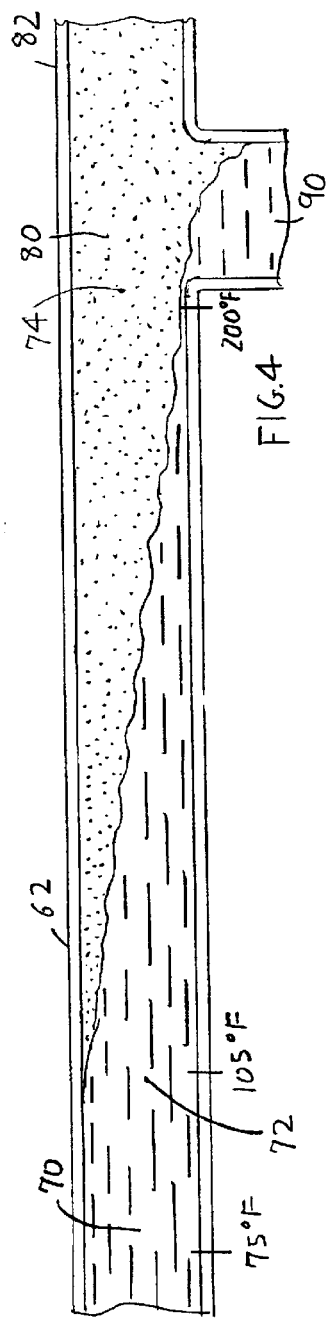
FIG. 4 is an enlarged view of a portion of the system of FIG. 1, showing separation of a liquid mixture of ammonia and water into gaseous ammonia and water vapor.
Figure 5:
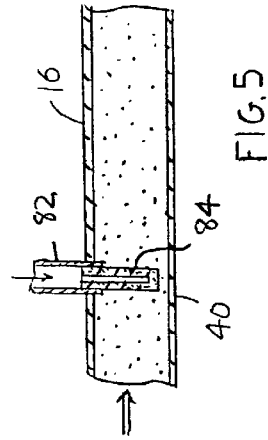
FIG. 5 is a sectional- view showing a portion of the apparatus of FIG. 2.

FIG. 4 indicates how the ammonia is separated from the water before injection of the ammonia into the exhaust conduit. Initially, the mixture 70 at a temperature such as 75° F. passes through the tube 36, to the tube portion 62 that is in a heat-exchange relationship with the exhaust conduit, so material within the tube portion 62 is rapidly heated. With the initial percent of ammonia being about 25%, the ammonia is not released as a gas until the mixture reaches the location 72 which is at about 105° F. Progressively more ammonia is released as the temperature of the mixture progressively increases. At the location 74, the mixture has a temperature of about 200° F., and only a few percent of ammonia remains in the mixture. The rest of the ammonia, indicated at 80, continues along a tube end portion 82 to an injector shown at 84 in FIG. 4. The injector can be of the type described in our earlier U.S. Pat. No. 5,992,141, which results in rapid heating of the gaseous ammonia prior to its injection into the very high temperature exhaust gasses, to activate the ammonia (break down some of the ammonia into its constituents) for injection into the exhaust gas stream.

The liquid 90 shown in FIG. 4 contains only a very small percent of ammonia, and is disposed of. One way to dispose of it, indicated in FIG. 1, is to carry the liquid with a very small percent of ammonia along a tube 92 for injection at 94 into the exhaust pipe. The location 94 is a location where the temperature of the exhaust gasses have been reduced to perhaps 250° F., in which case the small quantity of injected water will evaporate and become part of the exhaust gas stream that is admitted into the atmosphere. It should be noted that small pumps may be located in the injection system 30 where pressure increases are required. In FIG. 1, the metering valve 34 is controlled by a circuit 100 that also controls a fuel injector 102 that injects fuel from a fuel line 104 into the engine cylinders. As discussed in my earlier U.S. Pat. No. 5,992,141, this varies the amount of ammonia in accordance with the load on the engine, to more effectively neutralize nitrogen oxides.

Figure 6:
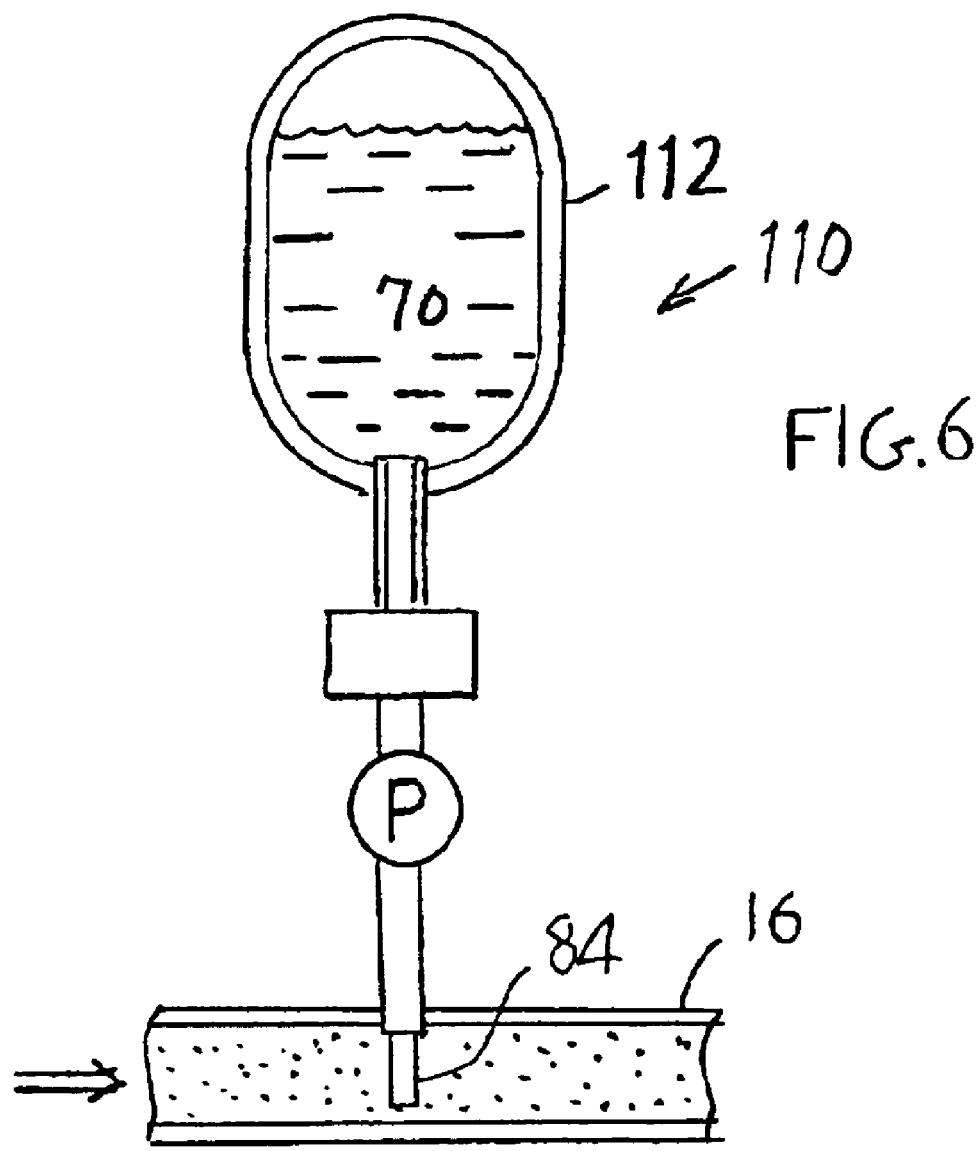
FIG. 6 is a simplified schematic view of a system of another embodiment of the invention.

FIG. 6 illustrates a system 110 which includes a container 112 that contains the mixture 70 of ammonia ($NH_3$) and water ($HO_2$). Other ingredients can be added to the mixture 70, but applicant prefers that most of the mixture be water and ammonia. The ammonia is required to reduce nitrogen oxides and the water is useful to retain the ammonia and is a liquid that is easily disposed of because of its benign characteristics. In the system 110, applicant passes the mixture 70, which may have perhaps 25% ammonia by weight, and water, directly through a nozzle or injector 84 that lies in the exhaust gas conduits 16, at an upstream location near or in the exhaust manifold. This system has the disadvantage that water is injected with the ammonia into the hot exhaust gasses, and tends to cool the exhaust gasses more rapidly. However, the amount of water and ammonia is very small, so the cooling effect of the water is very small. This system also has the disadvantage that the ammonia is not heated much prior to injection into the exhaust gas stream, so only a low percent of the ammonia, if any, is activated to break it down the ammonia into its components ($NH_2$ and $NH$) prior to injection. However, the simplicity of the system 110 can make it useful even if its effectiveness in reducing nitrogen oxides is not as great.

Thus, the invention provides a system for reducing nitrogen oxides in the exhaust gasses of an engine by the injection of ammonia into the exhaust gasses, which facilitates storage of the ammonia. The ammonia is stored as a mixture of ammonia and water (other liquids can be present), with the percent of ammonia preferably being between about 15% and 50% to avoid the generation of pressured ammonia gas. In one system, the mixture is heated to convert most of the ammonia into its gaseous state and separate it from the water that still remains liquid, and with the gaseous ammonia being further heated to activate at least a portion of it and then being injected into the hot exhaust gasses near or in the exhaust gas manifold. In a simpler system, the ammonia and water mixture are both flowed towards the exhaust gas conduit and both ammonia and water are injected into the exhaust conduit.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In an engine which includes means for combusting hydrocarbons in air to produce work wherein said means also produces a stream of exhaust gasses that contain nitrogen oxides, with the engine having an exhaust conduit through which the exhaust gasses are passed before being emitted into the atmosphere, the improvement comprising:

a source of ammonia:

an injector apparatus coupled to said source to receive ammonia therefrom and inject the ammonia into said exhaust conduit;

said source of ammonia comprises a container containing a mixture of ammonia and water;

said injector apparatus includes a tube that lies in a heat-exchange relationship with said exhaust conduit to use the heat of the exhaust gasses to heat the mixture of ammonia and water, and a separation station that receives said heated mixture and separates liquid water from gaseous ammonia, and directs them along different paths, and that injects the gaseous ammonia into said exhaust conduit.

2. The engine described in claim 1 wherein:

said mixture of ammonia and water in said container includes about 25% ammonia and about 75% water.

3. In an engine which has an engine block with cylinders where hydrocarbons are combusted in air to produce work, and which has an exhaust conduit that carries away a stream of exhaust gasses that contain nitrogen oxides, a source of ammonia and an injection apparatus that is coupled to said source and that injects ammonia into the conduit to reduce nitrogen oxides, the improvement wherein:

said source of ammonia comprises a container and a liquid mixture of ammonia and water in said container, said container being thermally isolated from said engine block and said exhaust conduit and said engine;

a separation station that heats said mixture and separates liquid water from gaseous ammonia, and directs them along different paths, and that injects the gaseous ammonia into said exhaust conduit.

4. The engine described in claim 3 wherein:

said injector apparatus includes a tube that carries said liquid mixture and that lies in a heat-exchange relationship with said exhaust conduit to use the heat of the exhaust gasses to heat the mixture of ammonia and water.

5. The engine described in claim 3 wherein:

said mixture of ammonia and water in said container includes about 25% ammonia and 75% water.

* * * * *